US011581826B2

(12) United States Patent
Lagorgette et al.

(10) Patent No.: US 11,581,826 B2
(45) Date of Patent: Feb. 14, 2023

(54) LINEAR PIEZOELECTRIC MOTOR WITH LONGER TRAVEL

(71) Applicant: ETA SA Manufacture Horlogere Suisse, Grenchen (CH)

(72) Inventors: Pascal Lagorgette, Bienne (CH); Pascal Meyer, Neuchatel (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 294 days.

(21) Appl. No.: 16/965,817

(22) PCT Filed: Feb. 14, 2019

(86) PCT No.: PCT/EP2019/053706
§ 371 (c)(1),
(2) Date: Jul. 29, 2020

(87) PCT Pub. No.: WO2019/170385
PCT Pub. Date: Sep. 12, 2019

(65) Prior Publication Data
US 2021/0058009 A1     Feb. 25, 2021

(30) Foreign Application Priority Data
Mar. 9, 2018  (EP) .................................. 18160982

(51) Int. Cl.
*H02N 2/04*      (2006.01)
*G04B 13/02*     (2006.01)
(Continued)

(52) U.S. Cl.
CPC ............. *H02N 2/046* (2013.01); *G04B 13/02* (2013.01); *G04C 3/12* (2013.01); *H02N 2/026* (2013.01)

(58) Field of Classification Search
CPC ........ H02N 2/046; H02N 2/026; H02N 2/001; G04B 13/02; G04C 3/12
See application file for complete search history.

(56) References Cited

U.S. PATENT DOCUMENTS 5,369,627 A  * 11/1994  Ikegami ................. G04B 13/02
                                                   368/220
6,768,245 B2     7/2004  Mock et al.
(Continued)

FOREIGN PATENT DOCUMENTS

CN        1892187 A     1/2007
CN      101019301 A     8/2007
(Continued)

OTHER PUBLICATIONS

Combined Chinese Office Action and Search Report dated Apr. 28, 2022 in Chinese Patent Application No. 201980017878.7 (with partial English translation), 14 pages.
(Continued)

*Primary Examiner* — Emily P Pham
(74) *Attorney, Agent, or Firm* — Oblon, McClelland, Maier & Neustadt, L.L.P.

(57) ABSTRACT

A linear piezoelectric motor including a passive element having an elongated shape, and a piezoelectric actuator including a resonator including a pair of arms connected at one of their ends at a connection zone, the two other ends being called free, the passive element being capable of being moved linearly between the free ends by friction of the free ends against the passive element, the passive element and the resonator being inclined with respect to one another by a non-zero angle (α) of less than 90 degrees.

6 Claims, 1 Drawing Sheet

(51) Int. Cl.
*G04C 3/12* (2006.01)
*H02N 2/02* (2006.01)

(56) References Cited

U.S. PATENT DOCUMENTS

| | | |
|---|---|---|
| 2002/0038986 A1 | 4/2002 | Magnussen et al. |
| 2002/0038987 A1 | 4/2002 | Magnussen et al. |
| 2002/0050765 A1 | 5/2002 | Magnussen et al. |
| 2003/0052575 A1 | 3/2003 | Mock et al. |
| 2004/0095040 A1 | 5/2004 | Magnussen et al. |
| 2005/0023933 A1 | 2/2005 | Magnussen et al. |
| 2007/0001547 A1 | 1/2007 | Sawada |
| 2007/0164635 A1 | 7/2007 | Witteveen et al. |
| 2017/0176945 A1 * | 6/2017 | Lagorgette ............. G04B 29/04 |

FOREIGN PATENT DOCUMENTS

| | | | |
|---|---|---|---|
| CN | 203457073 U | 2/2014 | |
| CN | 104617811 A | 5/2015 | |
| DE | 10146703 A1 * | 4/2003 | ........... H02N 2/0065 |
| JP | 60-26476 A | 2/1985 | |
| JP | 62-262676 A | 11/1987 | |
| JP | 63-294278 A | 11/1988 | |
| JP | 2-461 80 A | 2/1990 | |
| JP | 4-265671 A | 9/1992 | |
| JP | 2003-516100 A | 5/2003 | |
| JP | 2007-40967 A | 2/2007 | |
| JP | 2008-503995 A | 2/2008 | |
| JP | 2017-93086 A | 5/2017 | |
| WO | WO 01/41228 A1 | 6/2001 | |
| WO | WO 2011/058889 A1 | 5/2011 | |

OTHER PUBLICATIONS

International Search Report dated Aug. 14, 2019 in pCT/EP2019/053706 filed on Feb. 14, 2019, 4 pages.
Japanese Office Action dated Sep. 21, 2021 in Japanese Patent Application No. 2020-542294 (with English tanslation), 8 pages.
Japanese Office Action dated Jan. 18, 2022 in Japanese Patent Application No. 2020-542294 (with English translation), 6 pages.

* cited by examiner

LINEAR PIEZOELECTRIC MOTOR WITH LONGER TRAVEL

FIELD OF THE INVENTION

The invention relates to the technical field of linear piezoelectric motors.

BACKGROUND OF THE INVENTION

A linear piezoelectric motor conventionally includes a passive element and an actuator allowing to linearly move the passive element by using the piezoelectric effect. In reference to FIG. 1, the linear piezoelectric motors 10 for which the passive element is an elongated element 20 (for example a bar having a rectangular cross-section) and the piezoelectric actuator includes a resonator 30 formed by a pair of arms 31, 32 connected to one another at a connection zone 33, substantially in the shape of a tuning fork or a U, are in particular known. The actuator further includes two piezoelectric elements (not shown), each attached to one of the arms 31, 32, and acting as means for exciting the arms to impose vibrations thereon. Moreover, the passive element 20 extends between the arms 31, 32 of the resonator 30 in a substantially parallel manner, its axial guiding being ensured by guide means 50 located at a distance from the resonator. The passive element 20 is also in local contact with the free ends 310, 320 of the arms 31, 32 of the resonator 30, so that the passive element 20 is moved axially by friction of the free ends 310, 320 of the arms 31, 32 on the region of contact. Thus, the passive element 20 moves between the free ends 310, 320.

In uses in which it is important to reduce the bulk of the piezoelectric motor, in particular in the horological field, the arms 31, 32 of the resonator 30 must have a short length, which limits the maximum linear travel of the passive element 20. The axial translation of the passive element 20 in the direction of the connection zone 33 is limited by the presence of said connection zone 33 which acts as a stop, and its axial movement in the other direction is limited by the length of the arms 31, 32. This limited travel is problematic in certain situations, in particular if the passive element 20 meshes with a wheel 60, for example via a trammel system, since the rotation of the wheel 60 is thus restricted. For example, if the travel of the passive element 20 is limited to approximately 1 millimetre, then the diameter of the wheel 60 must be at most approximately 0.3 millimetres in order for said wheel 60 to be able to carry out a complete rotation during the travel. This dimension is too small to be technically feasible.

A linear travel of the passive element of at least 3 millimetres is necessary for the pinion to be technically feasible: with such travel, the diameter of the pinion must be approximately 1 millimetre to carry out a complete rotation.

SUMMARY OF THE INVENTION

The goal of the present invention is thus to increase the maximum linear travel of the passive element.

For this purpose, according to a first aspect, the invention relates to a linear piezoelectric motor comprising:
 a passive element having an elongated shape,
 a piezoelectric actuator including a resonator comprising
  a pair of arms connected at one of their ends at a connection zone, the two other ends being called free,
the passive element and the resonator being inclined with respect to one another by a non-zero angle of less than 90 degrees, the passive element being capable of being moved linearly between the free ends by friction of the free ends against the passive element.

Inclining the passive element with respect to the resonator allows to avoid the axial movement of the passive element being stopped by the connection part between the arms. Naturally, the angle of inclination must be sufficiently high to avoid the passive element being able to be stopped by the zone of intersection of the arms of the resonator.

In a preferred embodiment, the angle of inclination is between 5 and 25 degrees.

A small angle of inclination is preferred since the greater the angle, the smaller the total bulk, and the greater the performance losses at the interface between the passive element and the resonator.

According to a second aspect, the invention relates to a linear piezoelectric motor comprising:
 a passive element having an elongated shape,
 a piezoelectric actuator including a resonator comprising
  a pair of arms connected at one of their ends at a connection zone, the two other ends being called free, the passive element being capable of being moved linearly between the free ends by friction of the free ends against the passive element,
each arm comprising a main branch connected at the free end by a connector zone, the connector zone being arranged to bring the free ends to a level different than that of the main branches.

Thus, the resonator is mainly on two levels: at the first level are the main branches, at the second level are the free ends, and the connector zone is used to connect the two levels. Thus the passive element is raised with respect to the main branches, reducing or even eliminating (according to the inclination given to the passive element) the risks of the passive element being stopped against the connection zone of the arms.

In one embodiment, the passive element extends substantially parallel to the main branches.

This embodiment is advantageous with respect to the first aspect of the invention in that the performance losses at the interface between the passive element and the resonator are lower, since there is no inclination between the free ends and the passive element.

The invention also relates to a timepiece including a piezoelectric motor as described in detail above.

In a non-limiting embodiment, the timepiece includes a pinion meshing with a toothing of the passive element, the pinion being constrained to rotate with a hand of the timepiece.

BRIEF DESCRIPTION OF THE DRAWINGS

Other particularities and advantages will be clear from the description that is made thereof below, for informational purposes and in no way limiting, in reference to the appended drawings, in which.

DETAILED DESCRIPTION OF THE PREFERRED EMBODIMENTS

Figure 1:
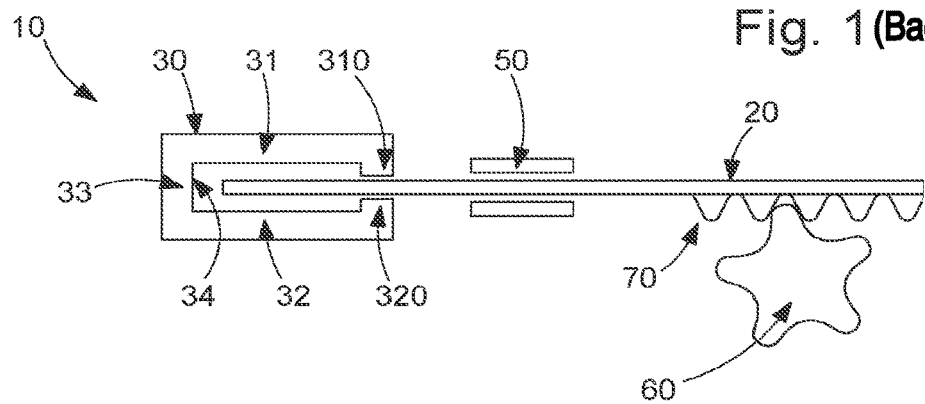
FIG. 1, already described, schematically shows a linear piezoelectric motor according to the prior art, FIG. 2 schematically shows a linear piezoelectric motor according to a first embodiment of the invention, FIG. 3 schematically shows a linear piezoelectric motor according to a second embodiment of the invention, FIG. 4 schematically shows the piezoelectric actuator of the piezoelectric motor of FIG. 3.
Figure 2:
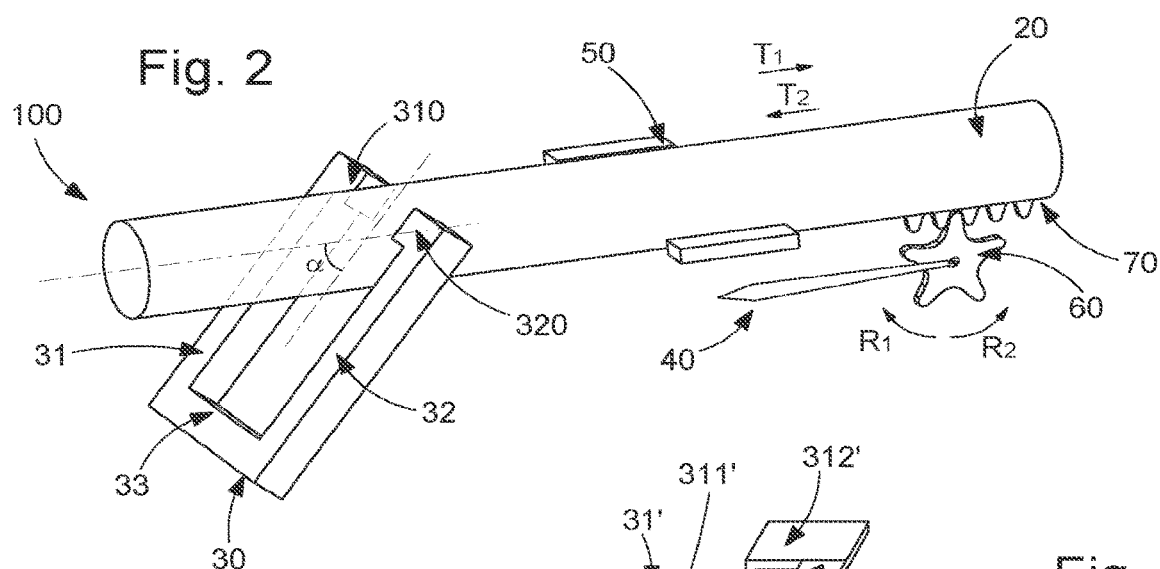
Figure 4:
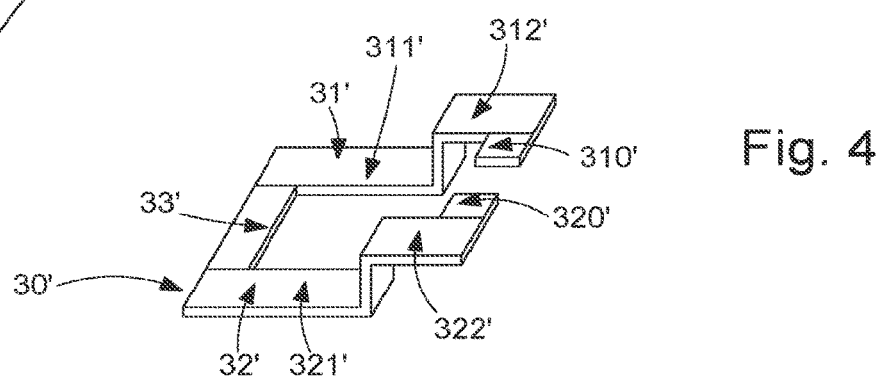
Figure 3:
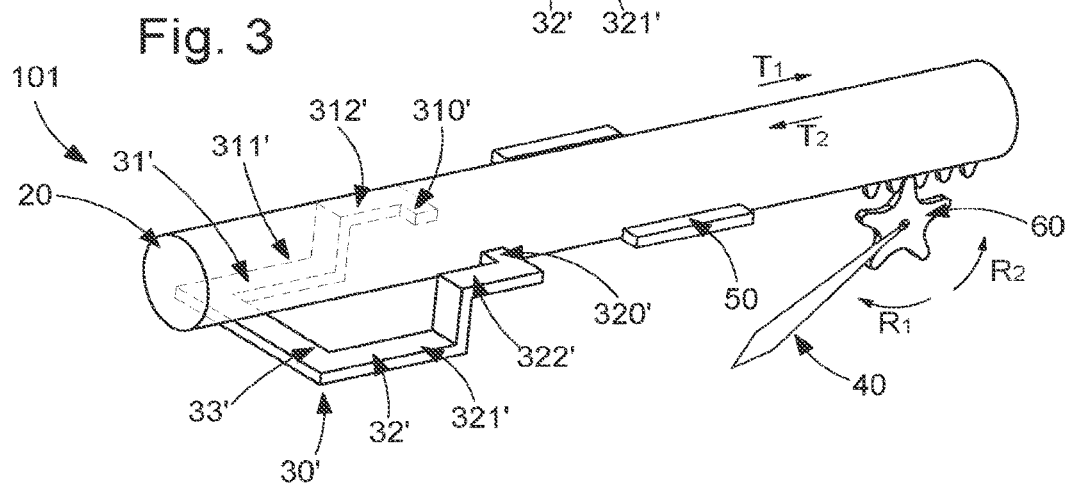

FIG. 2 shows a device 100 for rotating a wheel 60, said device comprising a piezoelectric motor according to a first embodiment of the invention, and FIG. 3 shows a device 101 for rotating said wheel 60 comprising a piezoelectric motor according to a second embodiment of the invention. In both cases, the piezoelectric motor comprises a passive element 20 having an elongated shape, and a piezoelectric actuator allowing to translate (that is to say move linearly/axially) the passive element 20 by using the piezoelectric effect. It is noted that the passive element 20 has been shown in the shape of a cylinder in FIGS. 2 and 3, but it could totally have another profile (for example rectangular). The rotation device 100, 101 also includes means 50 for axially guiding the passive element 20, allowing to maintain its orientation during its translation. The guide means 50 are placed at a distance from the piezoelectric actuator. These are for example a rail. Moreover, the rotation device 100, 101 includes teeth 70 disposed at an end of the passive element 20 and meshing with the toothing of the wheel 60. A rotation of the wheel 60 in a first direction of rotation R1 is possible via the teeth 70 when the passive element 20 is translated in a first direction of movement T1. A rotation of the wheel 60 in a second direction of rotation R2 opposite to the first direction of rotation R1 is possible via the teeth 70 when the passive element 20 is translated in a second direction of movement T2 opposite to the first direction of movement T1.

In the first embodiment illustrated in FIG. 2, the piezoelectric actuator includes piezoelectric excitation means, not shown, and a resonator 30 comprising two arms 31, 32 capable of oscillating. The excitation means advantageously consist of two parts, each attached to a different arm. However, other embodiments of the excitation means are possible, they can for example consist of a single part disposed at a joint between the arms. During the application of an adapted voltage to the excitation means, the excitation means are deformed, and mechanical stresses are transmitted to the arms 31, 32 which thus begin to oscillate. By a suitable design and mounting of the excitation means on the arms, multidimensional oscillations having a desired shape can be achieved.

The arms 31, 32 are connected at a connection zone 33, and extend substantially parallel to one another from said connection zone 33. The resonator 30 thus generally has the shape of a tuning fork, that is to say the shape of a U. However, this shape is not limiting. The ends of the arms not connected at the connection zone 33 are called free ends 310, 320. The amplitude of the oscillations of the arms 31, 32 is maximal at these ends 310, 320. The passive element 20 passes between the free ends 310, 320 of said arms 31, 32. The multidimensional oscillations of the free ends 310, 320 of the arms 31, 32 thus allow to impose an axial translation onto the passive element 20, by friction of said ends 310, 320 against the passive element 20. Thus, the passive element 20 is capable of being moved linearly between the free ends 310, 320.

However, the passive element does not extend parallel to the arms 31, 32. The axis of the passive element 20 extends with respect to the plane comprising the axes of the arms 31, 32 with a non-zero angle of inclination a of less than 90 degrees. The greater the angle, the bulkier the piezoelectric motor and the greater the performance losses at the resonator/passive element interface. It is thus important to limit the angle of inclination a. However, the angle of inclination a must be sufficiently large, that is to say the resonator 30 must be sufficiently inclined with respect to the passive element 20, for the travel of the passive element 20 to not be hindered by the connection zone 33.

In the second embodiment illustrated in FIG. 3, the piezoelectric actuator includes a resonator 30' having a shape different than that of the resonator 30 of the first embodiment. The resonator 30' comprises two arms 31', 32'. Said arms 31', 32' are connected at a connection zone 33'. Each arm 31', 32' comprises a main branch 311', 321', a free end 310', 320', and a connector zone 312', 322' allowing to connect the main branch 311', 321' and the free end 310', 320'.

The main branches 311', 321' extend substantially parallel to one another from said connection zone 33'. The connection zone 33' and the two main branches 311', 321' are on the same level, that is to say the axes of the connection zone 33' and the axes of the two main branches 311', 321' are comprised in the same plane.

The free ends 310', 320' extend on the contrary on a different level, and the plane containing the axes of the free ends 310', 320' is parallel to the plane of the main branches 311', 321' mentioned in the preceding paragraph. In the embodiment shown in FIG. 3, the connector zones 312', 322' each comprise a portion extending orthogonally to the main branches 311', 321' so as to bring the free ends 310', 320' to a level different than that of the main branches 311', 321'. However, the connector zones 312', 322' could indeed have another shape, the important thing being that the resonator comprises two stages.

The free ends 310', 320' extend one in the direction of the other and facing one another, and the passive element 20 passes between said free ends 310', 320' in parallel to the main branches 311', 321'. The piezoelectric actuator includes piezoelectric excitation means, not shown. The excitation means advantageously consist of two parts, each attached to one of the free ends 310', 320'. During the application of an adapted voltage to the excitation means, the excitation means are deformed, and mechanical stresses are transmitted to the free ends 310', 320' which thus begin to oscillate. By a suitable design and mounting of the excitation means on the arms, multidimensional oscillations having a desired shape can be achieved. The multidimensional oscillations of the free ends 310', 320' of the arms 31', 32' allow to impose an axial translation on the passive element 20, by friction of said ends 310', 320' against the passive element 20. Thus, the passive element 20 is capable of being moved linearly between the free ends 310', 320'.

Such a resonator with two levels allow to avoid the travel of the passive element 20 being hindered by the connection zone 33. It is noted that in the second embodiment, it is not necessary for the passive element 20 to extend parallel to the main branches 311', 321', it could be slightly inclined with respect to the plane containing the axes of the main branches 311', 321'. However, the performance at the resonator/passive element interface would therefore be lower. Moreover, with an inclination that is too great, the passive element 20 could be stopped in the connection zone 33'.

It is noted that one advantage of the second embodiment with respect to the first embodiment is that the performance losses at the resonator/passive element interface are low since the free ends are not inclined with respect to the passive element. However, the manufacturing of the resonator of the first embodiment is simpler than that of the resonator of the second embodiment.

The rotation device 100, 101 according to one of the embodiments of the invention can absolutely be integrated into a timepiece of the wristwatch type, in particular a timepiece comprising a hand 40 coaxial to and constrained to rotate with the wheel 60. However, the rotation device according to one of the embodiments of the invention could be used to drive not a hand, but a disc (for example a date disc or a lunar phase disc), a wheel or a ring in rotation.

It is understood that the invention also relates to a method for actuating the hand (or the disc, wheel, ring, etc.) of the timepiece described in the preceding paragraph, the method comprising the following steps:

translating the passive element of the piezoelectric motor in a first direction so as to cause a complete rotation of the pinion and consequently of the hand, translating the passive element in a second direction opposite to the first direction, at a speed sufficiently fast for its movement to not be detected by the eye.

It is understood that various modifications and/or improvements and/or combinations obvious to a person skilled in the art can be provided for the various embodiments of the invention disclosed above without going beyond the context of the invention defined by the appended claims.

The invention claimed is:

1. A linear piezoelectric motor, comprising:
a passive element having an elongated shape, and
a piezoelectric actuator including a resonator comprising a first arm and a second arm connected at respective ends at a connection zone, the two other ends being free, the passive element being configured to move linearly between the free ends by friction of the free ends against the passive element,
wherein a longitudinal axis of the first arm is substantially parallel to a longitudinal axis of the second arm, and the passive element and the resonator are inclined with respect to one another by a non-zero angle of less than 90 degrees.

2. The linear piezoelectric motor according to claim 1, wherein the angle of inclination is between 5 and 25 degrees.

3. A timepiece including a piezoelectric motor according to claim 1.

4. The timepiece according to claim 3, further including a wheel meshing with a toothing of the passive element, the wheel being constrained to rotate with a hand of the timepiece.

5. A linear piezoelectric motor, comprising:
a passive element having an elongated shape, and
a piezoelectric actuator including a resonator comprising a pair of arms connected at one of their ends at a connection zone, the two other ends being free, the passive element being configured to move linearly between the free ends by friction of the free ends against the passive element,
each arm comprising a main branch connected at the free end by a connector zone, the connector zone being arranged to bring the free ends to a level different than that of the main branches.

6. The linear piezoelectric motor according to claim 5, wherein the passive element extends substantially parallel to the main branches.

* * * * *